United States Patent
Gonopolsky et al.

[11] Patent Number: 5,943,970
[45] Date of Patent: Aug. 31, 1999

[54] METHOD AND EQUIPMENT FOR THERMAL DESTRUCTION OF WASTES

[76] Inventors: Adam Mikhailovich Gonopolsky, Lazarevsky per., d. 4, kv. 114, Moscow, Russian Federation, 127018; Yakov Abrammerovich Goldshtein, Kashirskoye sh., d. 28, k. 2, kv. 15, Moscow, Russian Federation, 115522; Nikolai Gedeonovich Doniants, Golyanovskaya 7A, k.4, kv., Moscow, Russian Federation, 105266; Sergei Alexeevich Panfilov, Istra, ul. Basova, d. 7, kv. 5, Moscow obl., Russian Federation, 143500; Eduard Semenovich Tilman, Kastanayevskaya ul., d. 23, k. 2, kv. 71, Moscow, Russian Federation, 121108

[21] Appl. No.: 08/596,129
[22] PCT Filed: Apr. 29, 1994
[86] PCT No.: PCT/RU94/00098
§ 371 Date: Feb. 9, 1996
§ 102(e) Date: Feb. 9, 1996

[30] Foreign Application Priority Data

Aug. 10, 1993 [RU] Russian Federation ............. 93040418

[51] Int. Cl.$^6$ ....................................................... F23G 7/00
[52] U.S. Cl. ........................ 110/346; 110/237; 110/250; 110/345; 110/203; 219/121.38; 588/201
[58] Field of Search ...................................... 110/346, 250, 110/237, 203, 215, 345; 219/121.36, 121.37, 121.38; 588/201, 237

[56] References Cited

U.S. PATENT DOCUMENTS

| 4,644,877 | 2/1987 | Barton et al. | 110/250 |
|---|---|---|---|
| 5,281,790 | 1/1994 | Nguyen Handfield et al. | 219/121.38 |
| 5,301,620 | 4/1994 | Nagel et al. | 110/346 |

*Primary Examiner*—Henry A Bennett
*Assistant Examiner*—Susanne C. Tinker
*Attorney, Agent, or Firm*—Ilya Zborovsky

[57] ABSTRACT

The method and equipment are proposed for wastes thermal destruction on the surface of a bath of melted metal and slag with a heating in plasma jets and the off-gas bubbling through a bath of melted slag, including a plasma hose generated in waste introduction zone which prevents the coming waste from contact with cooled units of the facility; thus, the reliable destruction of bacteria contaminated and toxic wastes are provided. The plasma hose is generated by the coaxial plasma torch with the hollow central electrode through which the wastes are fed. The units for a regular bacteriological examination of waste treatment products are also provided when the processed wastes are infectious wastes generated by medical and veterinary institutions.

12 Claims, 3 Drawing Sheets

METHOD AND EQUIPMENT FOR THERMAL DESTRUCTION OF WASTES

FIELD OF TECHNOLOGY

The invention deals with thermal destruction of wastes, in particular, it refers to methods for wastes incineration and designing of incinerators with an extra heating of processed wastes.

In particular, the invention relates to the methods and equipment for thermal treatment of assorted wastes which consist of both combustable and noncombustable materials including refractory components.

Specifically, the invention concerns methods and equipment for thermal destruction of wastes which contain or may contain harmful components dangerous for the environment or wastes which produce such components during decomposition, especially thermal.

To be more specific, the invention concerns methods and equipment for destruction of infectious wastes generated by medical and veterinary clinics and institutions.

TECHNOLOGIES CURRENTLY APPLIED IN WASTE TREATMENT

Proper treatment and disposal of wastes in an environmentally acceptable manner has been an issue of serious concern among the industrial community, regarding each and every region and field of industry.

Processing of multicomponent waste with harmful and/or uncontrolled inclusions such as medical and veterinary wastes, domestic garbage or municipal wastes have become the most troubling problem. When dealing with such types of wastes any sorting or mechanical processing prior to wastes destruction is unwanted because it provokes some additional contacts with harmful and hazardous components and create an extra risk of contamination for the environment. It is generally agreed, that wastes of such types are to be destroyed intact with no preliminary sorting, in the incinerators equipped with the devices for an extra (usually, electrical) heating, which enables the proper heat recovery of complex wastes consisting of combustible (organic) and noncombustible (metals and slag-forming materials components.

Before transportation and loading into the furnace, the wastes are usually dosed, packaged and, if required, hermetically sealed to prevent the pollution of the area during wastes transitional storing (collecting) and transportation to the destination facility.

Of considerable current use is incineration of waste in a shaft furnace with a heating in plasma jets up to a temperature not less than 2000° C. in an oxidizing atmosphere. With a sufficient time of treatment, the method allows full destruction (combustion) of organic components and melting of solid inclusions (see the U.S. Pat. No. 4,508,040, issued in 1985, F 23 D 1/00 class). According to this Patent, off-gases are released through a gas duct located in the shaft upper zone and the melt is discharged through a tap hole located at the bottom of the furnace.

A high level of reliability is ensured when wastes are incinerated on the surface of melted slag produced initially of appropriate materials loaded and melted prior to wastes introduction and maintained subsequently by melting of metallic components of wastes and by forming of slag of noncombustible compounds whereas surpluses of both melted metal and slag obtained are to be discharged. The related method and equipment are described, in particular, in Russian Federation Application No. 4953477/33 submitted Jun. 24, 1991 by the applicants who are in part the authors of the invention (Panfilov S, Simonov A, llyakhin S.), nowadays, the Patent No. 1836603 issued Aug. 23, 1993, class F 23 G 5/00.

Given common technological reasons, the walls and roofs of such furnaces including the wastes loading area, are cooled. In the above mentioned Patent of Russian Federation the reaction zone is sealed and the heating in plasma jets on the surface of melted slag is conducted at temperatures between 2500° C. and 4500° C. provided by plasma torches located over the hearth of the shaft furnace along the perimeter. The heating in the oxidizing atmosphere generated by oxygen enriched air fed into the torches provides the full destruction of all solid wastes and the safe release of wastes processing products, such as melted slag and metal. Considering that a certain part of gas components in the products of decomposition may be given off at an early stage of the treatment and may, therefor, contain some undecomposed harmful elements, the off-gases are released through a layer of melted slag through one or several waterlocks, formed between a sealed bath located beneath the roof and reaction zone of the furnace, the off-gases also pass through the waterlocks formed in the bath due to the vertical partitions with windows in the bottom area; for the same purpose, the gas duct is located in the opposite from the furnace end of the bath. For a more reliable thermal treatment of slag constituent in the waste processing products, the tap hole is equipped with a siphon trap and is placed next to the gas duct with a slag drainage level higher than the window of the partition.

In some cases, more stringent requirements are placed, however, upon the thermal treatment and destruction of medical bacteria contaminated waste, of certain types of municipal waste which most likely contain some radioactive elements (luminescent dials and signs) and of used polymeric materials which generate toxic products when incinerated. If medical waste includes bacteria infected materials, a bacteria contaminated zone may spread beyond the complex of equipment causing the pollution of the environment which occurs due to the possible contact of contaminated wastes with the cooled parts of the facility outside the high-temperature plasma treatment zone, in particular, the infectious waste may come into contact with water-cooled units of loading device and plasma torches, especially the moments immediately after a regular portion of wastes is loaded into the furnace, a sealed packing (usually, made of plastic) is already destroyed and the process of hazardous waste destruction is at its earliest stage.

DESCRIPTION OF THE INVENTION

The objective of the invention is to develop the method for waste thermal destruction using extra heating (normally, electrical) of treated materials which causes no pollution of the environment with dangerous or unwanted constituents of waste, such as infectious waste generated at hospitals and veterinary clinics.

The other purpose of the invention is to create a facility for wastes destruction, namely, the furnace for wastes incineration which provides the safe combustion of wastes and prevents harmful and hazardous components from penetrating into surroundings and coming into contact with cooled units of the equipment, particularly the moment immediately after the wastes are loaded.

The third purpose of the invention is to develop the method and equipment for waste destruction which allow a regular bacteriological testing of products generated by the infectious medical and veterinary wastes processing.

These objectives among other ones stated in the invention are met by implementation of the method for wastes thermal destruction in a closed space on melted slag surface while wastes are loaded onto the surface of melted slag and additionally heated, the generated metal, slag and off-gases produced are released with off-gases passing through the melted slag; according to the invention, the method also provides that a plasma hose is formed over the melt surface and wastes are fed through the plasma hose.

The closed space is meant a space which prevents products generated by treatment, such as metals, slag and off-gases, from an uncontrolled release and provides that the output of said products occurs in places designed for the purpose; by the off-gases is meant, unless otherwise implied within a context, both gases released by wastes and the reaction gases which are purposely fed into the closed volume for implementation and/or intensification of wastes thermal destruction.

The term additional heating is used in reference to any specially conducted heating other then heating resulted from liberation of thermal energy during incineration of combustible components of treated wastes.

Off-gases passing through the melted slag means the conditions under which the off-gases are forced to bubble through the layer of melt being exposed to the heat produced by melted slag before they reach the outlet in the closed volume.

According to the invention, by a plasma hose which is generated over the surface of melt and intended for processed wastes introduction is meant a formation of a hollow-shaped turbulent high-temperature gas stream by which the introduced waste are isolated and forwarded onto the surface of melt.

In order to generate the above mentioned plasma hose, the preferable variants of method's implementation offer a coaxial plasma torch with a hollow internal electrode, that is an electric-arc plasma torch with the two tubular electrodes, one of which is positioned inside of the other. An electric arc in such a torch burns in a annular gap situated between the two electrodes, exactly where plasma-forming gas (in most cases, air) is supplied. The tangential air supply as well as rotation of the arc affected by magnetic field from the solenoid which is put on the external electrode, provide the formation of a tubular rotating plasma stream (hose) into which, along its axis, the wastes are fed through the internal electrode of the torch.

According to the Invention, high efficiency level of wastes thermal destruction is achievable with an additional heating of the surface of melt at temperatures between 1500° C. (with a temperature lower than 1500° C. the stickiness of melted slag is growing which makes it difficult for the off-gas to bubble) and 5000° C. (higher temperatures reduce the efficiency of units providing additional heating and make requirements to the elements of construction more stringent). Nevertheless, for the preferred variant it is advisable that the temperature on the surface of melt should be maintained at a level between 2500° C. and 4500° C. which leads to better operating conditions and that thermal destruction of waste should be performed in the oxidizing atmosphere, preferably in oxygen-enriched air, though in some cases non-oxygenated air is sufficient. In the most important cases, pure oxygen may be fed into the extra heating zone.

With the objectives of the invention in view, it is most adequate to introduce into the closed space preliminary dosed and packed wastes; normally, the hazardous wastes are packed on site when collected, i.e. in medical institutions and veterinary clinics, but such a practice may not be a criterion which limits the invention since, according to the invention, contaminated wastes thermal destruction may also take place on site where the waste is generated (i.e. at biochemical plants and so on).

As already stated, the implementation of the invention does not require additional study to determine the operating conditions which could guarantee the safe destruction of wastes of a certain type. Nevertheless, considering the big volumes and high speed with which the gas goes out under the normal conditions of wastes heat processing, it is advisable to conduct a regular bacteriological testing of the off-gases. The off-gases may be examined in a very simple and reliable manner, that is through an interaction between a certain part of the effluent gases flow (samples) and a biologically active fluid; such an examination also involves a monitoring of a change in optical characteristics of the biologically active fluid.

In some cases it is recommended to provide an additional testing on bacteria of released metal and, especially, slag, since the melted slag is normally discharged as a continuous flow in order to guarantee both a constant difference between the levels of melt in the bubbling zone and a stability of the process; whereas it is possible to release the melted metal at regular intervals, as it accumulates.

Above mentioned purposes, among other objectives stated in the invention are realized through an installation for thermal destruction of waste equipped with a reaction chamber adapted for a bath of melted metal and slag which is formed in this chamber; with units to heat the bath and wastes onto it; besides, the facility includes a bubbling chamber, adapted for a melted metal and slag flow coming into it from the reaction chamber, whereas the two chambers are separated by a partition which forms a water-lock in the melt; in addition, the facility has a device for waste loading, a tap-hole for excessive metal and slag discharge, the gas duct for reaction and effluent gases escape out of the bubbling chamber and a coaxial plasma torch with a hollow inner electrode connecting the loading device and the reaction chamber.

The reaction chamber may be made both as a shaft furnace which is better for relatively small volumes of treated wastes and as any hearth furnace with a closed reaction space.

The reaction and bubbling chambers have a single heat resisting bottom so that during the process the two chambers form a single bath of melted metal and slag, (both preliminary loaded into the reaction chamber and produced from the processed waste). The two chambers are separated by a partition with a lower border beneath the slag release outlet in the tap-hole. Thus, the melted slag layer over the surface of the bath of melted metal is levelled above the lower border of the partition which forms the water-lock in melted slag. Since the stack for off-gases evacuation goes from the bubbling chamber, the different pressure in the reaction and bubbling chambers and, respectively, the different levels of melted slag in the two chambers are afforded; the off-gases are forced to bubble through melted slag under the partition being exposed to the melt extra heat to afford a full destruction of any microorganisms which may be present in the treated materials.

Usually, the accumulation of metal melted from treated wastes is a long process which determines the release of excessive metal at considerable intervals. The position of the tap-hole for output of metal is of no critical importance; it is specified given the reasons of easier assembly and installation of equipment; in some cases it is possible to place the tap-hole for the melted metal discharge in the reaction chamber of the facility.

To prevent the off-gases escape through the tap-hole for slag release it is advisable to place a siphon trap in front of the tap-hole. The best applications of the invention suggest that the bubbling chamber should contain the tap-hole, but there are other variants, in particular, the tap-hole may be positioned in a subsidiary chamber connected with the reaction chamber.

To provide extra heating of wastes treatment zone, which is the bath of melted metal and slag generated in the reaction chamber and wastes coming onto the bath, different types of well-known devices are used, such as fuel torches, electrical-arc heaters or induction heaters. Nevertheless, the best application of the invention which gain advantages considering both life of equipment and power consumed uses for the purpose the plasma torches placed along the perimeter of the reaction chamber. In particular, they may be installed tangentially at the side walls of the reaction chamber, or along the perimeter of the roof of the reaction chamber, preferably with a slope towards the centre of its bottom.

According to the invention, if a certain modification of the equipment is designed for heat destruction of huge amounts of wastes and is, correspondingly, of a large size or if the bubbling chamber is considerably extended some extra sources to heat the melted metal in the reaction and bubbling chambers should be provided in addition to already mentioned sources for extra heating of wastes destruction zone, since with no sources of extra heating a solidification of melt may occur, especially in the area remote from the reaction chamber. As the extra sources of heating may be used burners, plasma torches or reaction (ohmic) heating systems.

In some cases it is recommended that the bubbling chamber should have an additional partition which separates the parts of the chamber along the off-gases passage and creates an additional water-lock in the melted slag in much the same manner as the partition separating the reaction and bubbling chambers. Such a partition provokes the repeated off-gases bubbling through the melted slag in order to obtain better results of the gases heat treatment. Moreover, it reduces the amount of droplets of slag which penetrates into the gas duct preventing the gas duct from being overgrown with solidifying slag.

The unit for wastes loading my be constructed in a variety of ways, in particular, as a sluice chamber equipped with the operators, or as any feeding device or revolving mechanism and so on.

As it was already mentioned, the process of infectious waste heat destruction should be implemented providing the regular bacteriological off-gases tests, for which purpose the facility for wastes thermal treatment is equipped with the off-gases sampling device. Such a device is installed at the gas duct inlet, in particular, it may be built as a sampling tube in a flange of the gas duct. It is possible to conduct the sampled gas analyses off-site, i.e. in a specialized laboratory, but in some instances it is advisable to provide the equipment for infectious waste thermal destruction with the unit which enables off-gases testing for bacteria; the unit for off-gases bacteriological testing is placed next to the sampling device. The simple and efficient way to provide adequate units for off-gases bacteriological examination is to construct such units as a water-gas heat exchanger equipped with a block for off-gases temperature measurements and connected with a bubbling vessel containing biologically active fluid and as a device which monitors change in optical characteristics of biologically active fluid.

In some cases it is possible and advisable to equip the facility for wastes thermal destruction with supplementary units responsible for testing of released metal and slag for bacteria; each unit is designed in a form of a cooled ingot mold, which includes a block for metal and slag temperature measurements and is connected with a vessel containing biologically active fluid, and in a form of a mechanism transporting samples from the ingot mold into the vessel; in addition, each testing unit has a device monitoring change in optical characteristics of biologically active fluid.

BEST APPLICATIONS OF THE INVENTION

Figure 1:
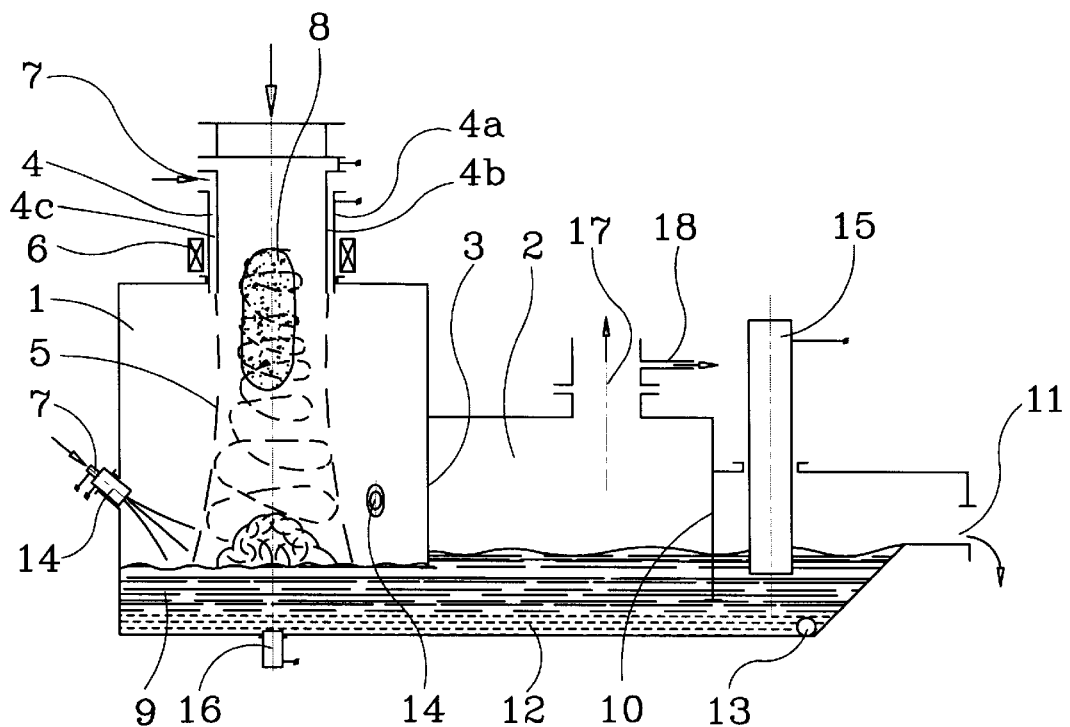
In FIG. 1 is shown a scheme of industrial size modification of wastes thermal destruction facility; in this modification the plasma torches for heating of the bath of melted slag and metal and of wastes coming onto the bath are positioned tangentially at the side walls of the reaction chamber; the equipment also includes electrodes for extra reaction heating of melted metal in the reaction and bubbling chambers.

In FIG. 1 is given a modification considered by the applicant to be the most adequate for industrial operation. The facility for wastes thermal destruction has the reaction chamber 1 and the bubbling chamber 2 separated by the partition 3 with a gap in the bottom area.

The upper section of the reaction chamber of the facility has a coaxial electric-arc plasma torch 4, with electrodes made as two coaxially positioned tubes 4a and 4b, one of which (4b) is placed inside of the other and connects the operation zone of the reaction chamber with the loading device through a hollow channel. The arc discharge takes place in a gap between the walls of the two electrodes where plasma forming gas is introduced; at the output into the reaction chamber the plasma forming gas creates a hollow high-temperature plasma hose 5. To stabilize the burning of the arc 4c and structure of the hose 5, the torch is equipped from the outside with a solenoid 6 rotating the arc and the plasma forming gas is fed into the torch through channels 7 tangentially. Waste packed in sealed soft bags 8 are fed through the inner electrode and plasma hose onto the melted slag 9 continuously poured from the furnace through a siphon trap formed by the partition 10 and the open tap-hole 11. The melted metal 12 gathering at the bottom under the slag layer is released through the tap-hole 13 as it accumulates.

The operating temperature is maintained by units for extra heating of wastes destruction zone, that is by jet plasma torches 14 placed tangentially in the reaction chamber above the layer of melt and by supplementary sources heating the melt in the reaction and bubbling chambers, such as graphite 15 and water-cooled bottom 16 electrodes permitting direct current through the melt.

Off-gases pass out of the reaction chamber into the gap in partition 3 through the layer of slag; a distance between the levels of the tap-hole and upper border of the gap determines different levels of melt in front and at the back of the partition. The gases go out of the bubbling chamber through the gas-duct 17 into the gas purifying system with the heat-exchanger.

Figure 2:
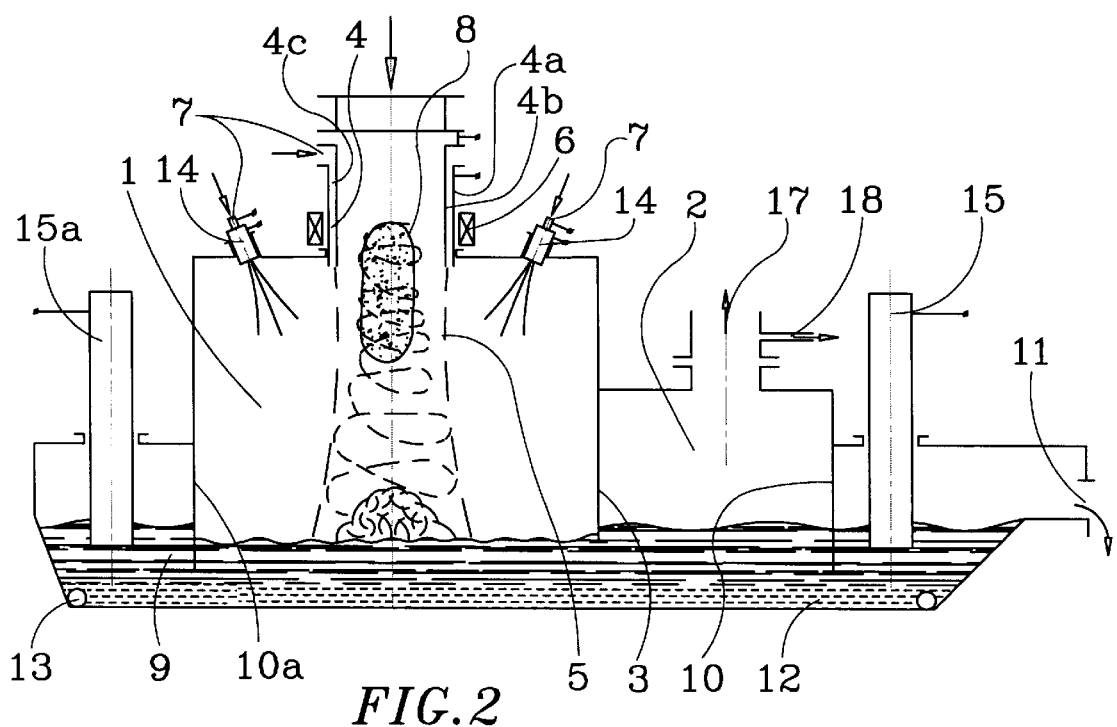
In FIG. 2 is shown a scheme of another industrial modification of waste destruction facility with plasma torches for heating of the bath of melt and of waste on the bath placed along the perimeter of the reaction chamber roof with a slope towards the centre of the bottom; the equipment has electrodes for extra reaction heating of the melted metal in the reaction and bubbling chambers, but the electrodes are placed in a different way; moreover, there is a supplementary chamber connected with the reaction chamber.

In FIG. 2 is shown another industrial modification of the facility with plasma torches 14 for extra heating of the waste destruction zone placed on the roof of the reaction chamber 1; in place of the water-cooled bottom electrode 16 the second graphite electrode 15a is used, which is in the same way as the first positioned behind the siphon partition 10a on the opposite side of the reaction chamber. Such a scheme makes it possible to operate the facility from the upper platform, to minimize a floor space occupied by the equipment and to keep the bottom intact using no bottom electrode.

Figure 3:
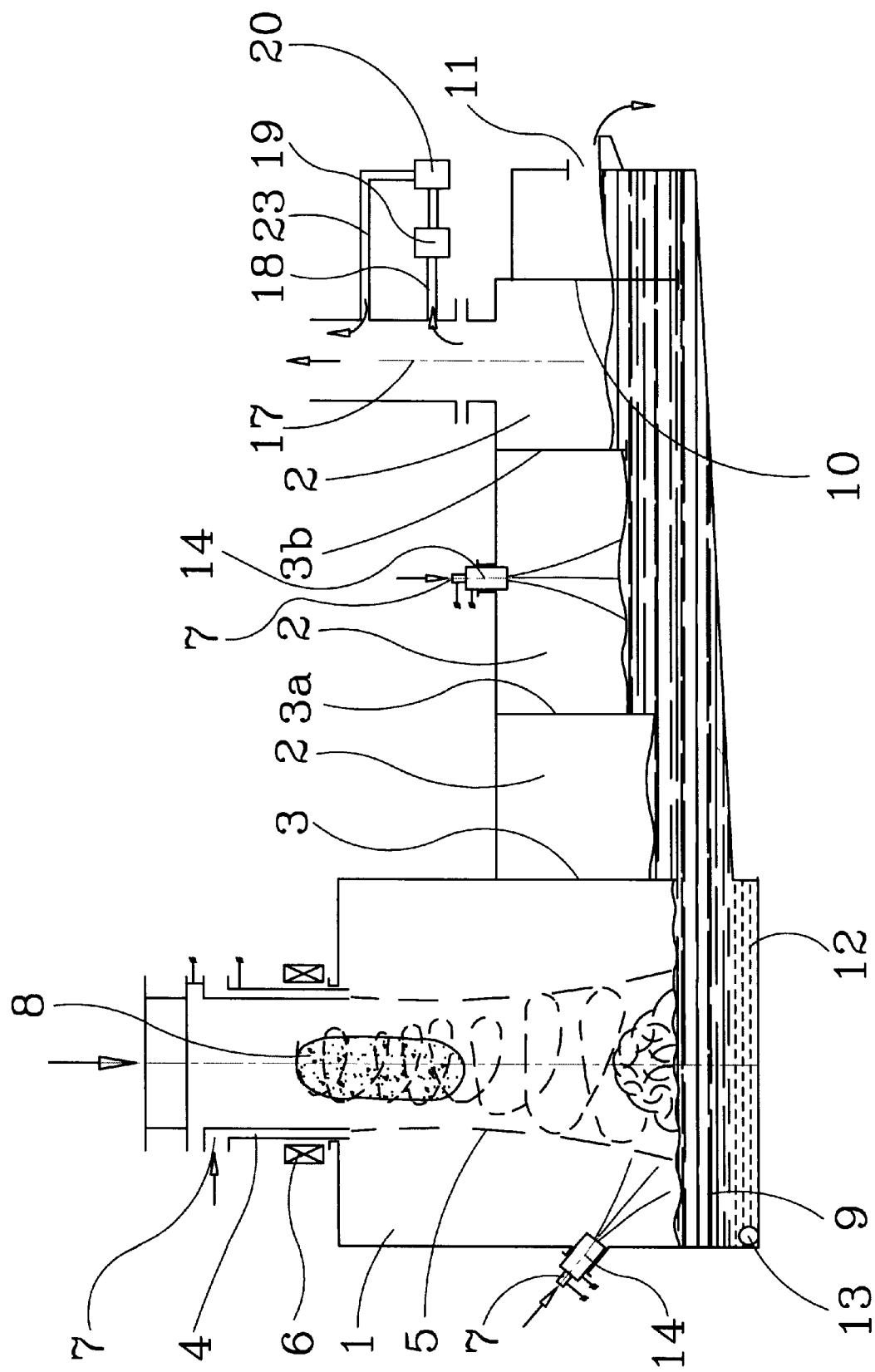
In FIG. 3 is presented a scheme of a laboratory modification of the facility for wastes thermal destruction; the reaction chamber is made as a shaft furnace; the plasma torches designed to provide heating of the melted metal and slag bath and of the waste on the bath are placed tangentially at the side walls; the bubbling chamber has some extra partitions.

In FIG. 3 is shown another one modification of the facility designed to handle huge volumes of off-gases (in comparison with a size of the equipment) with a higher risk of spraying and passing into the gas duct of incompletely incinerated particles; with this in view, the bubbling chamber is divided into several sections by the partitions 3a and 3b containing apertures in lower parts, the upper border of apertures heightens as melted slag and gases move from the reaction zone with a reduced drop in levels of slag adjacent to the partitions. The bottom slopes towards the reaction chamber to provide proper collecting of melted metal near the tap-hole 13 and release of the metal. The equipment was used when finishing off the process on a laboratory scale and designed for relatively small amounts of treated materials. From the inside the furnace is lined with a refractory; the metal case walls and the partition 3 are provided with a forced cooling.

Figure 4:
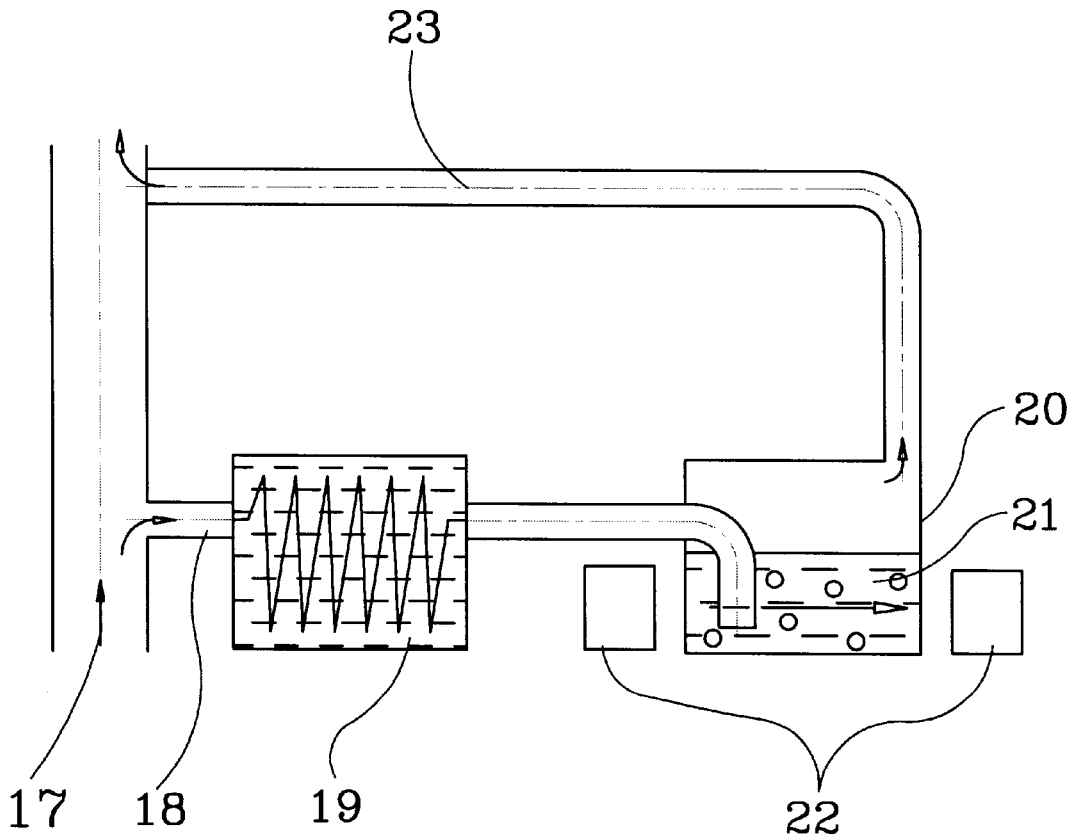
In FIG. 4 is shown a scheme of the unit testing the off-gases for bacteria.

To ensure the complete treatment of waste and destruction of infectious components regular off-gases tests for bacteria are performed at the gas-duct inlet 17 of all above described modifications using sampling devices, such as gas sampling channel (tube) 18 and the unit for off-gases bacteriological examination shown in FIG. 3 and (more detailed) in FIG. 4. It includes the heat-exchanger 19 which is needed because standard test fluids remain biologically active at temperatures not higher than 60° C.; it also includes the bubbling vessel 20 containing biologically active fluid 21 and the device 22 which determines the change in optical characteristics of biologically active fluid caused by infectious microorganisms and by an increase in number of such microorganisms due to reproduction and accumulating. Subjects of examination were either transmittance or refractive index of biologically active fluid. In the former case a standard light source and a photodetector (phototube) with an adequate supply and detection scheme were applied for the examination; in the latter was used a standard refractometer (in particular, described by Chuprilovsky, V. N. "Optical devices theory", Moscow-Leningrad, Mashinistrojenije, 1966, p.p. 170–174). With optical characteristics of the biologically active fluid changed more than by 1% the process of waste thermal destruction is to be adjusted for time and rate of operation of plasma torches 14. The bubbled gases are released into the gas duct through a discharge channel 23.

Figure 5:
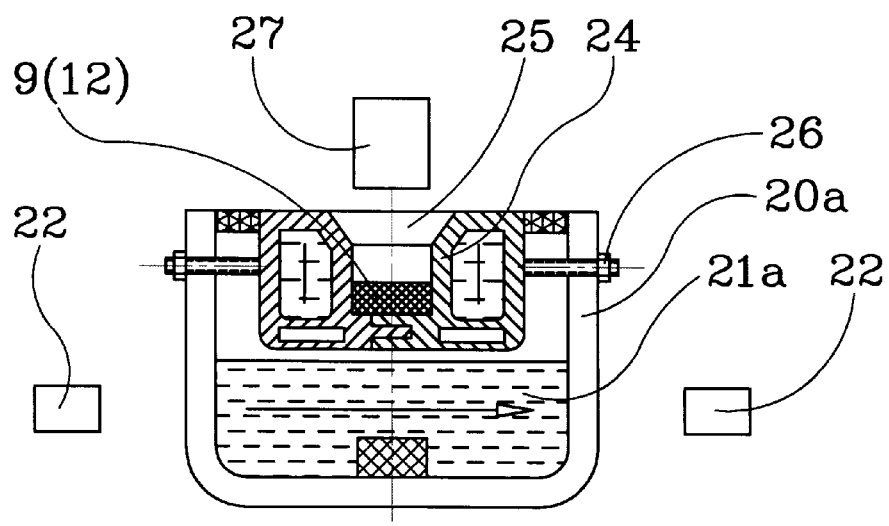
In FIG. 5 is shown the unit testing slag and metal for bacteria.

Slag and metal samples are in the same way tested on bacteria contamination using a chamber shown in FIG. 5. The chamber contains a vessel 20a filled with biologically active fluid 21a and placed into the vessel water-cooled separable ingot mold 24 into which melted slag 9 or metal 12 are introduced through a funnel 25; after the sample is cooled by an appropriate device 25 the ingot mold opens and using the block 27 the sample is transferred into the fluid 21a transmittance or refractory index of which are measured by the unit 22.

The waste heat destruction by above described facilities is performed in the following way. With a cool reaction chamber its heating is conducted given specified operating temperature and time by means of extra heating (plasma torches 14); if electrodes 15,16 (or 15,15a) are installed, a coke breeze layer is placed between them and heated using direct current accompanied by gradual loading of slag (ashes, flux), raising temperature and a bath of slag gradually filled up to a level of the slag tap-hole 11 while melted slag starts to go out through the tap-hole at temperatures between 1350° C. and 1500° C. After that, the plasma torches 4 and 14 are brought into operation given the power input and oxidant (oxygen-enriched or unoxygenated air) consumption and blocks for packed wastes feeding through the torch 4 are switched on given specified feed rate. The oxidant consumption is adjusted using off-gases tests for CO and oxygen percentage; the input of power into the furnace is regulated given released slag temperature; waste feed rate may also be regulated. With stable operating conditions off-gases and slag are tested for hazardous microbial components; power input into the torches is adjusted so as to obtain in the reaction zone the temperatures which ensure no bacteria in the samples. Produced in the gas phase harmful compounds and condensed particles are removed in a dust removing system connected with the gas duct.

The temperature on the surface of melt in the reaction chamber may be controlled applying optical methods, in the operating space by heat balance in plasma torches, using dynamic thermocouple or spectrum analysis.

Oxidant (oxygen enriched or unoxygenated air) is dosed controlling its consumption rate through the plasma torches and/or by its feeding into the reaction chamber through the separate channels.

At the end of the process, the waste feeding into the reaction chamber is stopped and the loading channel sealed; to control the full combustion of waste remaining in the reaction chamber the off-gas is tested for oxygen contents; with these contents equal in the off-gas and oxidant fed into the reaction chamber, the oxidant supply is getting lower, the tap-hole for metal release is opened and the melt discharged whereas the power input is maintained by the heating devices at a level which affords the exit of melt through the tap-hole; thereafter, the heating and gas supply are cut off.

Invention's Application to Medical Waste Treatment

To prove the efficiency of the method for waste thermal destruction according to the invention it was applied to the treatment of infectious medical waste generated by abscess surgery departments of hospitals, whereas the waste was processed in the facility identical to that shown in FIG. 3.

The wastes consisted of bandages, tampons, napkins and disposable medical instruments, such as syringes, scalpels and so on.

Microbiological inoculation performed according to standard techniques at the Sanitary Microbiology Laboratory of the First Medical Institute detected the wide range of purulent and septic infections, including such hyperthermoresistant microorganisms as Bacillul Botulinus and Bacillus Tetani spores. The amount of the microorganisms on the surface of the tampons and napkins was as high as $10^{12}$–$10^{13}$ units per 1 $mm^3$; the contaminated wastes looked as clots of slime. Disposable medical instruments were made from glass, metal and plastic.

Taking all necessary precautions against contamination the wastes were packed into plastic bags 40 mm across and 500 mm in length with no prior sorting. With the packing completed, a total of 70 bags was sealed using thermowelding.

After the facility was brought into operation as described above, the upright positioned bags were in turn loaded into the channel of an operating coaxial plasma torch 4. The treatment continued 15 min with the following operating conditions:

Strength of current of plasma torches arcs: 14–1250 ($\pm$) 20 A.

Voltage at plasma torches arcs: 180 ($\pm$) 10 V.

Rate of the gas flow through each of three plasma torches: 4,5 $m^3/h$.

Pressure in the furnace (in the torches zone): 0,4 mPa.

Strength of current of the coaxial plasma torch 4: 250 ($\pm$)20 A.

Voltage at the coaxial plasma torch arc: 180 ($\pm$) 10 V.

Rate of air flow through the coaxial plasma torch: 26,0 $m^3/h$.

Side walls of the shaft furnace as well as its upper wall and construction units of plasma torches and coaxial plasma torch were cooled with the total rate of cooling water supply 8,0 $m^3/h$ and with water pressure 0,38 mPa providing a sufficiently low temperature of loading device (made as a revolving mechanism) and of the inlet into the coaxial plasma torch. Throughout the process, cooled samples of the off-gases bubbled through the bubbling chamber 20 containing biologically active fluid with optical testing of the fluid as it was already described earlier. No visible change of refractive index (by more than 1%) of the fluid was registered.

With the process completed, the metal and slag were released and sampled, thereafter the cooled samples were placed into the chambers 20a containing biological solution 21a. No change in optical characteristics (that is the refractive index) of the solution which contacted with samples of both metal and slag was detected.

To prove the efficiency of the invention application, some additional samples of treatment products along with materials washed off the cooled units of the shaft furnace (after cooling) were sent to the Sanitary Bacteriology Laboratory in order to be tested for biological sterility using standard microbiological techniques. According to the results of analyses neither treatment products nor wash-off contained pathogens which were present in the waste prior to its treatment.

APPLICATION IN INDUSTRY

As evident from the foregoing, the invention may be applied to the treatment of waste, in particular, to the treatment of infectious waste generated by hospitals and other medical institutions in a safe and efficient manner both on the laboratory and industrial scale.

We claim:

1. A method of thermal destruction of waste, comprising the steps of forming a bath of a melted slag in a closed volume, heating the waste and introducing the waste onto a surface of said bath; passing off-gases produced through the melted slag, discharging the off-gases; releasing the produced metal and the slag from the bath; forming in the closed volume a plasma hose over the surface of the bath; introducing the waste through the hose; bacteriologically testing of the discharged off-gases throughout the thermal destruction; and interacting the testing of the off-gases with a biologically active fluid with controlling optical properties of the fluid.

2. A method as defined in claim 1, wherein said forming the plasma hose includes forming the plasma hose by a coaxial electric arc plasma torch with two tubular electrodes placed one inside the other.

3. A method as defined in claim 2; and further comprising maintaining a temperature on the surface of the bath at 2500–4500° C.; and keeping oxidizing atmosphere in the closed volume.

4. A method as defined in claim 1; and further comprising feeding the waste into the closed volume by packed doses.

5. A method as defined in claim 1, wherein said releasing the slag from the bath includes continuously removing the melted slag from the bath by gravity.

6. An equipment for thermal destruction of waste, comprising a reaction chamber formed as a closed volume with a bath of a melted slag inside; a loading device for introducing waste into said chamber; means for heating the waste and the slag; a bubbling chamber separated by a partition from said reaction chamber, said partition forming a hydraulic-lock in the melted slag which communicates said chambers with one another; tap holes for releasing a metal and a slag; a gas duct for discharging off-gases; a coaxial plasma torch with a hollow electrode having an inner channel communicating said loading device with said reaction chamber; a device for off-gases bacteriological control located next to said sampler, said device being formed as a water-gas heat exchanger with a block of off-gases temperature control and connected to a bubbling vessel containing a biologically active fluid; and a device controlling optical properties of the biologically active fluid.

7. The equipment as defined in claim 6, wherein said tap-hole for releasing the melted slag is disposed above a lower edge of said partition separating said reaction and bubbling chambers.

8. The equipment as defined in claim 6, wherein said means for heating the slag and metal of the bath and the waste are plasma torches.

9. The equipment as defined in claim 8; and further comprising additional means for heating the melted slag and metal in said reaction and bubbling chambers.

10. The equipment as defined in claim 6, wherein said bubbling chamber is provided with at least one additional partition forming an additional hydraulic-lock in the melted slag.

11. The equipment as defined in claim 6, wherein said gas-duct has an inlet provided with an off-gas sampler for bacteriological control.

12. The equipment as defined in claim 6; and further comprising an additional device for a bacteriological control of the metal and slag, said additional device being formed as a water cooled ingot mold with a block for a temperature control of the metal and slug, said ingot mold being connected to a vessel containing a biologically active unit; a mechanism for transferring samples for the metal and slug from said ingot mold into said vessel; and a device for controlling optical properties of the biologically active fluid.

\* \* \* \* \*